United States Patent
Kawasaki et al.

(10) Patent No.: US 7,880,412 B2
(45) Date of Patent: Feb. 1, 2011

(54) CONTROL APPARATUS FOR ELECTRIC VEHICLES

(75) Inventors: Shingo Kawasaki, Kariya (JP); Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 434 days.

(21) Appl. No.: 12/068,595

(22) Filed: Feb. 8, 2008

(65) Prior Publication Data
US 2008/0258656 A1 Oct. 23, 2008

(30) Foreign Application Priority Data
Apr. 17, 2007 (JP) ............... 2007-108258

(51) Int. Cl.
*H02P 3/00* (2006.01)
(52) U.S. Cl. .................. 318/139; 318/400.02
(58) Field of Classification Search .......... 318/727, 318/798, 800, 400.02, 139
See application file for complete search history.

(56) References Cited

U.S. PATENT DOCUMENTS

| | | | |
|---|---|---|---|
| 6,608,396 B2 * | 8/2003 | Downer et al. | 290/40 C |
| 6,917,179 B2 * | 7/2005 | Komatsu et al. | 318/700 |
| 7,099,756 B2 | 8/2006 | Sato | |
| 7,212,891 B2 | 5/2007 | Sato | |
| 2004/0145338 A1 * | 7/2004 | Nakamura et al. | 318/801 |
| 2006/0097671 A1 * | 5/2006 | Yoshida | 318/109 |
| 2007/0068727 A1 * | 3/2007 | Miura et al. | 180/446 |
| 2007/0119634 A1 | 5/2007 | Egami et al. | |
| 2007/0125582 A1 | 6/2007 | Egami et al. | |
| 2007/0126385 A1 | 6/2007 | Egami et al. | |
| 2007/0145926 A1 | 6/2007 | Egami et al. | |
| 2007/0145927 A1 | 6/2007 | Egami et al. | |
| 2007/0194763 A1 | 8/2007 | Egami et al. | |
| 2007/0229009 A1 | 10/2007 | Egami et al. | |
| 2007/0278986 A1 * | 12/2007 | Okamura | 318/798 |

OTHER PUBLICATIONS

U.S. Appl. No. 11/950,768, filed Dec. 5, 2007 (unpublished).

* cited by examiner

*Primary Examiner*—Rina I Duda
(74) *Attorney, Agent, or Firm*—Nixon & Vanderhye P.C.

(57) ABSTRACT

In a hybrid vehicle control apparatus, a motor control unit executes input power control on a MG unit to stabilize a system voltage. This input power control for MG unit is executed independently from torque control on an AC motor so that the input power control and the torque control are stabilized. The motor control unit further adjusts a current control gain for torque control in accordance with an input power amount of the MG unit. As a result, the current control gains of a q-axis current and a d-axis current for torque control are varied in correspondence to variations in torque variation rate in the q-axis direction and the d-axis direction in accordance with the input power amount, so that the torque is restricted from varying with variations in the q-axis current or the d-axis current.

12 Claims, 11 Drawing Sheets

US 7,880,412 B2

CONTROL APPARATUS FOR ELECTRIC VEHICLES

CROSS REFERENCE TO RELATED APPLICATION

This application is based on and incorporates herein by reference Japanese Patent Application No. 2007-108258 filed on Apr. 17, 2007.

FIELD OF THE INVENTION

The present invention relates to a control apparatus for an electric vehicle including a system for converting a voltage supplied by a DC power source into a system voltage by using a voltage converter and for driving an AC motor by applying the system voltage to the AC motor through an inverter.

BACKGROUND OF THE INVENTION

As disclosed in documents such as U.S. Pat. No. 7,212,891 (JP 2004-274945A), in an electric vehicle having AC motors mounted therein to serve as an energy source of the vehicle, the AC motors are each capable of serving as a motor for driving wheels of the vehicle as well as a motor driven by an engine to generate power. As the above system, a control apparatus for the electric vehicle includes a voltage boosting converter for raising a voltage supplied by a DC power source, which is implemented by a secondary battery, to a high DC voltage appearing on a power supply line connected to the AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, in order to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to changes in vehicle operating state or another reason, however, a voltage variation caused by a change in such relation as a voltage variation of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or balance of electric power) of the two AC motors equal to 0 at the time the connection between the DC power source and the voltage boosting converter is cut off by using a relay in the event of a failure occurring in the DC power source. However, this method is provided as a countermeasure to a failure occurring in the DC power source and is capable of enhancing the effect of stabilizing the voltage appearing on the power supply line in a normal state of the power supply. In addition, even if an attempt is made to control the inverter to make the sum of energies (or the balance of power) of the two AC motors equal to 0 in a normal state, it is difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient condition in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve a control apparatus for an electric vehicle to be capable of stabilizing a voltage appearing on a power supply line in small size and low cost and to be capable of reducing a torque variation to nearly zero in a transient condition of controlling an input power to a motor unit.

According to one aspect, in a control apparatus for an electric vehicle, a voltage supplied by a DC power source into a system voltage appearing on a power supply line is converted and an MG unit includes an inverter connected to the power supply line and drives an AC motor. A torque of the AC motor and an input electric power to the MG unit are controlled independently from each other. A system voltage stabilization control is performed to control the input electric power to the MG unit so as to suppress variation in the system voltage by sending a command value for input electric power control. At least one of a current control gain for torque control and a current control gain for input electric power control is adjusted in accordance with a control state of the MG unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Embodiment

Figure 1:
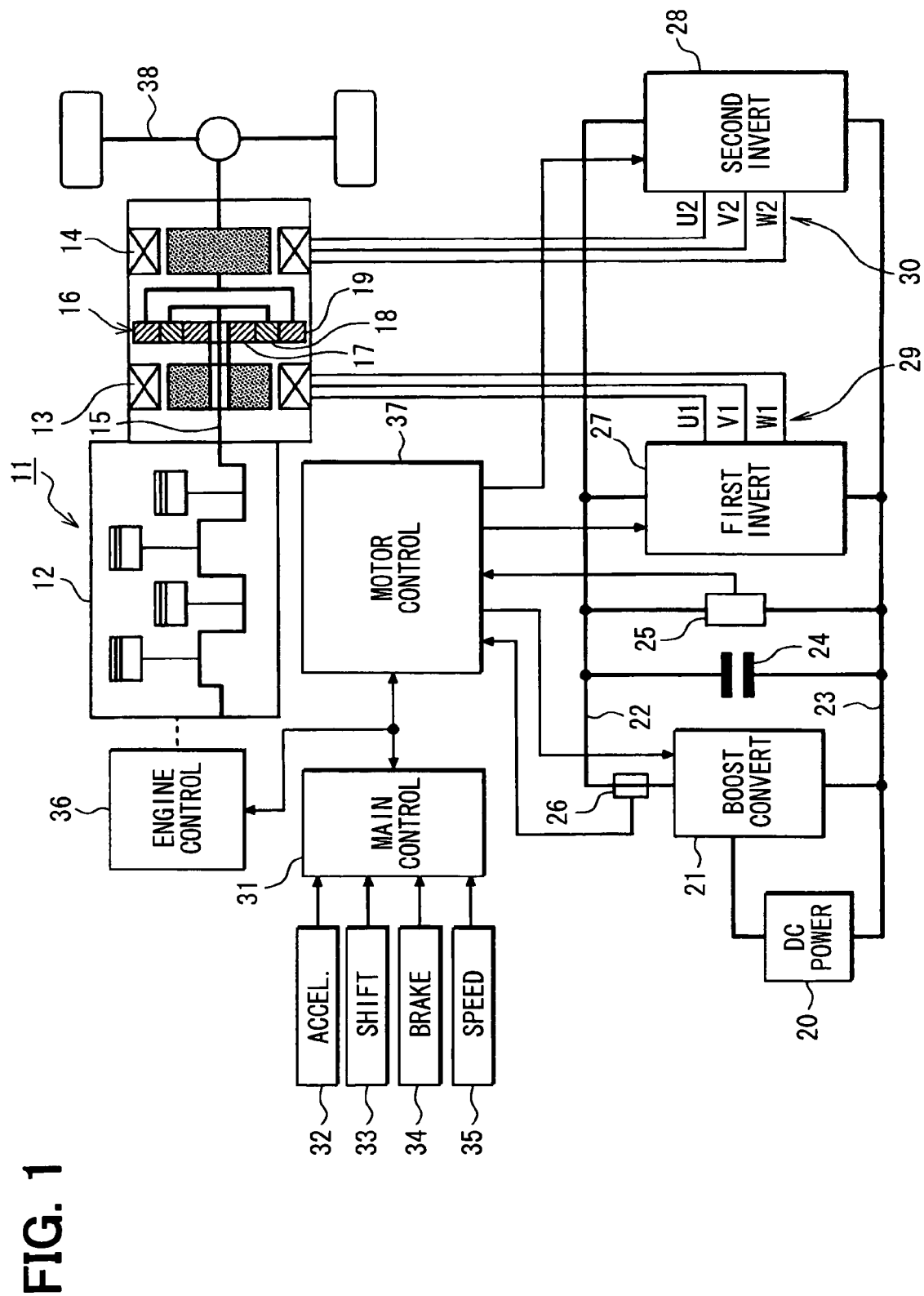
FIG. 1 is a block diagram showing a driving system for an electric vehicle in accordance with one embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as drive power sources for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at its radial center. The planetary gear 18 rotates along a circumference external to the sun gear 17 while revolving around its radial center. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the first AC motor 13.

A secondary battery serving as a DC power source 20 is connected to a voltage boosting converter 21 serving as an electric power conversion means. The voltage boosting converter 21 is a component having a function for increasing a DC voltage output by the DC power source 20 in order to generate a DC system voltage supplied between an electric power supply line 22 and a ground line 23 as well as a function for decreasing the system voltage in order to return or restore power to the DC power source 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit 29, which operates as a first MG unit 29. Similarly, the three-phase second inverter 28 and the second AC motor 14 form a second motor driving unit 30, which operates as a second MG unit 30.

A main control unit 31 is a computer for executing overall control on the electric vehicle as a whole. The main control unit 31 acquires signals output by a variety of sensors and switches in order to detect an operating state of the electric vehicle. The sensors and the switches include an accelerator sensor 32, a shift position switch 33, a brake switch 34 and a vehicle speed sensor 35. The accelerator sensor 32 is a sensor for detecting an accelerator operation amount representing an operation amount of an acceleration pedal. The shift position switch 33 is a sensor for detecting gear shift position of the electric vehicle. The gear shift position can be a parking position (P), a rear driving position (R), a neutral position (N) or a forward driving position (D). The brake switch 34 is a switch for detecting a braking operation. The vehicle speed sensor 35 is a sensor for detecting a value of the travel speed of the electric vehicle. The main control unit 31 exchanges control and data signals with an engine control unit 36 and a motor control unit 37, driving the engine control unit 36 and the motor control unit 37 to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
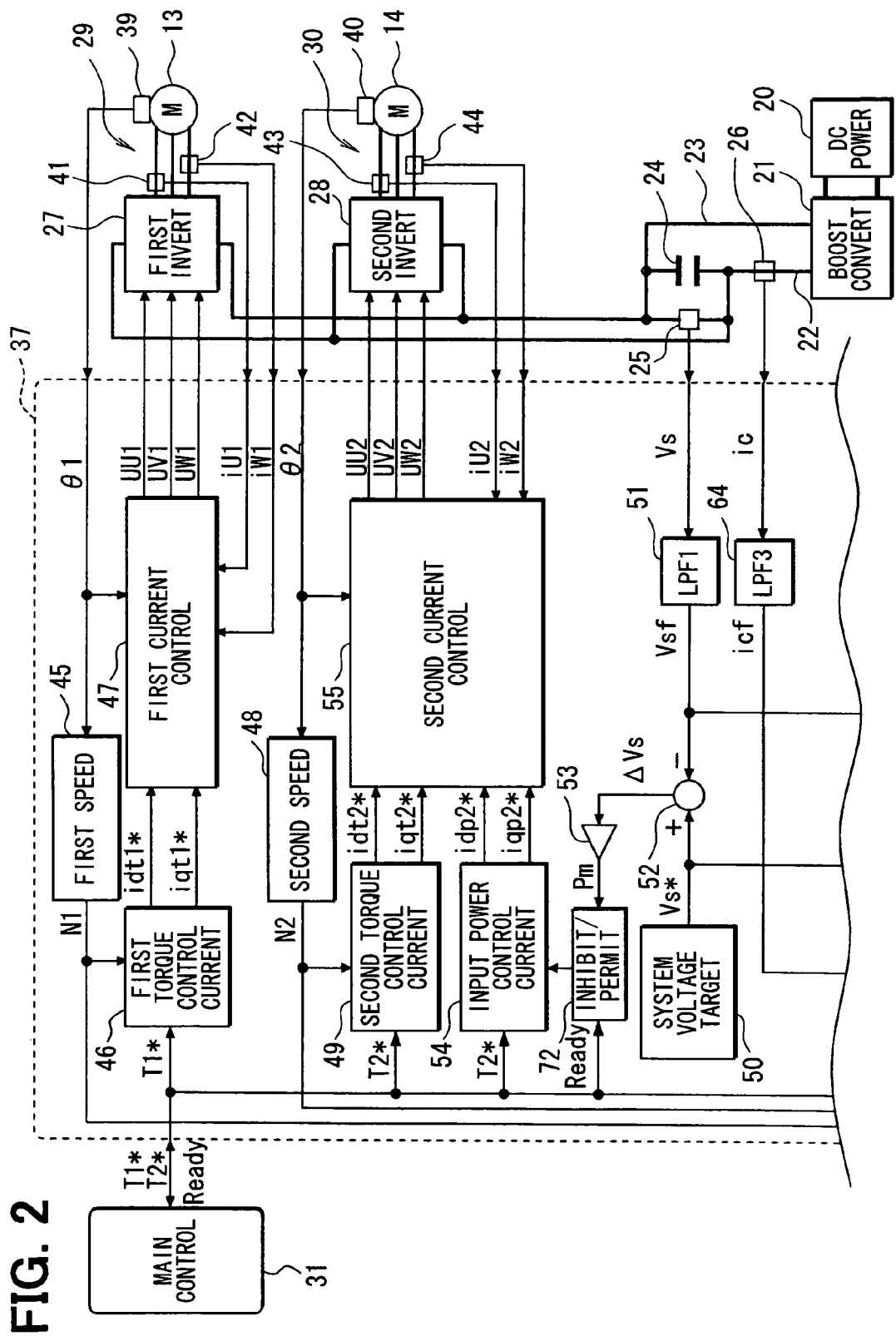
FIG. 2 is a block diagram showing one part of a control system employed in the driving system for controlling AC motors of the driving system in accordance with the embodiment.
Figure 3:
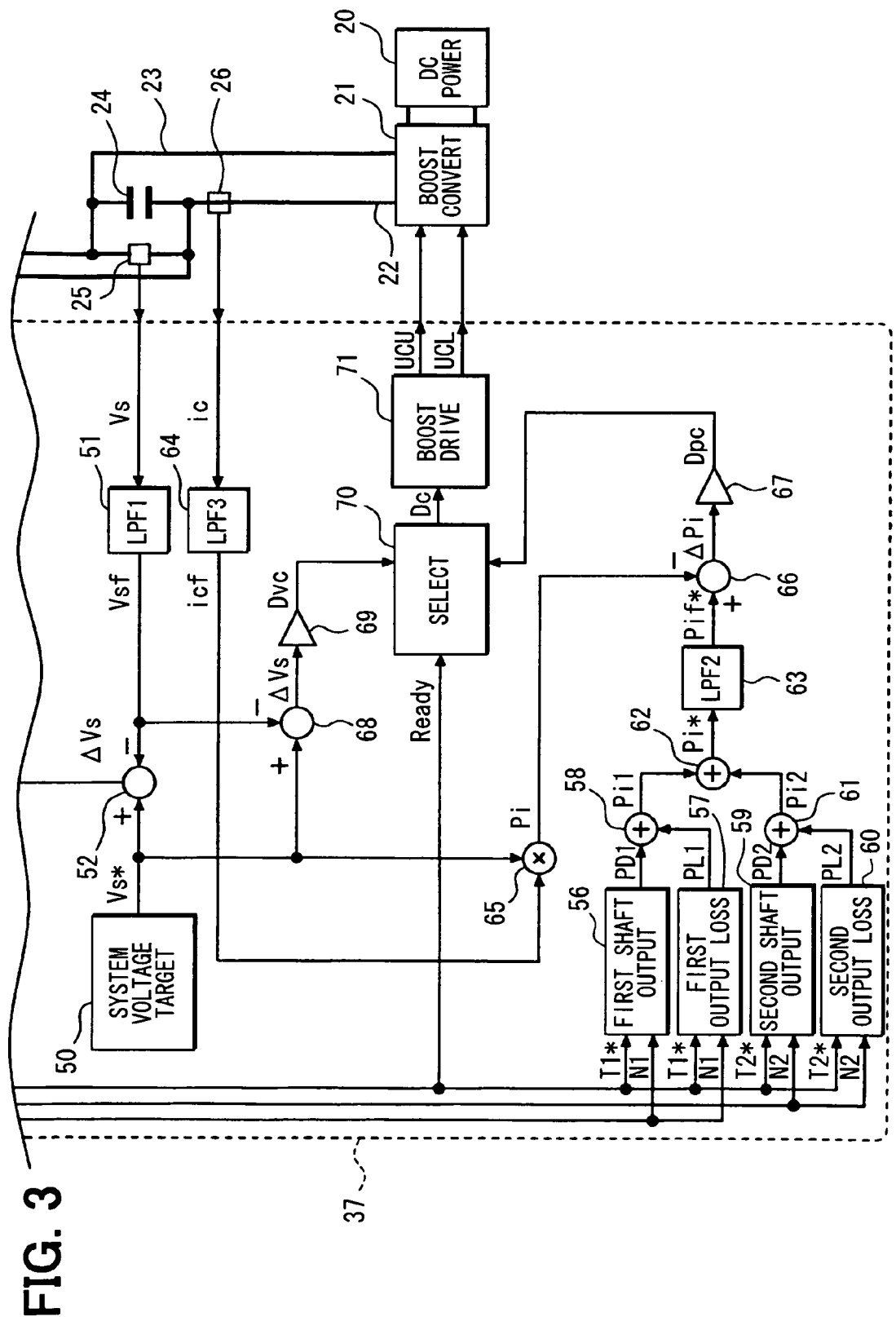
FIG. 3 is a block diagram showing the other part of the control system employed in the driving system for controlling AC motors of the driving system in accordance with the embodiment.

Next, control of the first AC motor 13 and the second AC motor 14 is described by referring to FIGS. 2 and 3. The first AC motor 13 and the second AC motor 14 are each a three-phase permanent-magnet synchronous motor having a permanent magnet in its inside. The first AC motor 13 and the second AC motor 14 have respectively rotor rotation position sensors 39 and 40 each used for detecting the rotation position of the rotor of the motor. On the basis of three-phase voltage command signals UU1, UV1 and UW1 output by the motor control unit 37, the first inverter 27 of the voltage control type converts the DC system voltage appearing on the power supply line 22 into three-phase AC voltages U1, V1 and W1 for driving the first AC motor 13. The DC system voltage appearing on the power supply line 22 is generated by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC system voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the first AC motor 13.

It is to be noted that the first AC motor 13 and the second AC motor 14 each also function as an electric power generator, when the first AC motor 13 and the second AC motor 14 are driven by the three-phase first inverter 27 and the three-phase second inverter 28 respectively to generate a negative torque. For example, when the electric vehicle 11 is being decelerated, AC power generated by the second AC motor 14 as deceleration energy is converted into DC power by the three-phase second inverter 28 and the DC power is accumulated back in the DC power source 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque applied to the ring gear 19 of the planetary gear set 16 is greater than a torque required by a running operation of the electric vehicle, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator (MG).

At the start of operating the vehicle drive system (at the operation start of the main control unit 31 or the motor control unit 37), the motor control system is in a state of being shut down (motor control and the like have been halted) and almost no electric charge has been accumulated in the smoothing capacitor 24. Prior to starting the motor control, therefore, it is necessary to pre-charge the smoothing capacitor 24 to elevate the system voltage up to a target value.

Therefore, the motor control unit 37 executes a main motor control program shown in FIG. 14 that will be described later. That is, right after the start of system operation but before the smoothing capacitor 24 has been sufficiently pre-charged, the motor control unit 37 selectively executes the conversion voltage control to control the output voltage of the voltage boosting converter 21 so that the system voltage is quickly brought into agreement with the target value. During execution of this conversion voltage control, the motor control unit 37 further prohibits the electric power command value (input power operation amount Pm) for stabilizing the system voltage that will be described later from being output to an input electric power system (input electric power control current computation unit 54 to thereby prohibit the execution of control for stabilizing the system voltage. After the smoothing capacitor 24 has been pre-charged, a pre-charge completion signal is transmitted to the main control unit 31.

When it is so determined on the basis of the pre-charge completion signal and other signals that the motor control system may be released from the shut-down state, the main control unit 31 transmits a ready signal to the motor control unit 37.

Upon receipt of the ready signal, the motor control unit 37 releases the motor control system from the shut-down state, executes the motor control, discontinues the conversion voltage control, and changes the control over to the conversion power control. Thus, the motor control unit 37 controls the output electric power of the voltage boosting converter 21 so that the output voltage of the voltage boosting converter 21 is brought into agreement with the command value.

In the motor control, the control unit 37 executes the torque control for torque control of the first AC motor 13, the torque control for torque control of the second AC motor 14, and the system voltage stabilization control for controlling the input power of the second AC motor 30 so that variation in the system voltage may be suppressed. The control unit 37 executes the torque control for the second AC motor 14 and the input power control for the second MG unit 30 independently from each other. In this instance, the motor control unit 37 adjusts a current control gain for torque control and a current control gain for input power control in accordance with a control state of the second MG unit 30. The control state may be the input electric power control amount of the second MG unit 30, and the rotation speed, torque, etc. of the second AC motor 14.

The motor control unit 37 executes the motor control (torque control, system voltage stabilization control), the conversion voltage control and the conversion power control as described below.

(Motor Control)

The motor control unit 37 executes motor control (torque control, MG power control and system voltage stabilization control) as well as the conversion voltage control and conversion power control.

When the smoothing capacitor 24 has been sufficiently pre-charged, that is, pre-charging the smoothing capacitor 24 has been completed, after the start of system operation, the motor control unit 37 releases the motor control system from the shut-down state and executes the motor control (torque control, system voltage stabilization control).

In execution of torque control on the first AC motor 13, the motor control unit 37 generates the three-phase voltage command signals UU1, UV1 and UW1 by a sinusoidal-waveform PWM control method on the basis of a torque command value T1* output by the main control unit 31, the U-phase current iU1 and W-phase current iW1 of the first AC motor 13 as well as the rotor rotation position θ1 of the first AC motor 13 as described below. The U-phase current iU1 and the W-phase current iW1 are signals output by the current sensors 41 and 42 respectively, whereas the rotor rotation position θ1 is a signal output by the rotor rotation position sensor 39.

The signal output by the rotor rotation position sensor 39 as a signal representing the rotor rotation position θ1 of the first AC motor 13 is supplied to a first rotation speed computation unit 45 for computing a first rotation speed N1 of the first AC motor 13. Then, in order to apply current feedback control to each of a d-axis current id1 and a q-axis current iq1 independently of each other in a d-q coordinate system set as a rotation coordinate system of the rotor of the first AC motor 13, a first torque control current computation unit 46 computes a torque control current vector it1* representing a d-axis torque control current idt1* and a q-axis torque control current iqt1* by using typically map data or a mathematical equation as a vector according to the torque command value T1* and rotation speed N1 of the first AC motor 13.

Subsequently, a first current vector control unit 47 computes an actual current vector i1 (d-axis current id1 and the q-axis current iq1) on the basis of the U-phase current iU1 and W-phase current iW1 of the first AC motor 13 as well as the rotor rotation position θ1 of the first AC motor 13 as described below. As described above, the U-phase current iU1 and the W-phase current iW1 are signals output by the current sensors 41 and 42 respectively, whereas the rotor rotation position θ1 is the signal output by the rotor rotation position sensor 39. Then, the first current vector control unit 47 computes a d-axis command voltage Vd1* by execution of proportional-and-integral (P-I) control for reducing a difference Δid1 between the d-axis torque control current idt1* and an actual d-axis current id1, and computes a q-axis command voltage Vq1* by execution of P-I control for reducing a difference Δiq1 between the q-axis torque control current iqt1* and an actual q-axis motor detection current iq1. Finally, the first current vector control unit 47 converts the d-axis command voltage Vd1* and the q-axis command voltage Vq1* into the three-phase PWM command signals UU1, UV1 and UW1, outputting the three-phase PWM command signals UU1, UV1 and UW1 to the three-phase first inverter 27.

Thus, the torque control for torque control of the first AC motor 13 is executed to realize the torque command value T1* output by the main control unit 31.

In execution of torque control on the second AC motor 14, on the other hand, the motor control unit 37 generates the three-phase voltage command signals UU2, UV2 and UW2 by the sinusoidal-waveform PWM control method on the basis of a torque command value T2* output by the main control unit 31, the U-phase current iU2 and W-phase current iW2 of the second AC motor 14 as well as the rotor rotation position θ2 of the second AC motor 14. As described below, the U-phase current iU1 and the W-phase current iW1 are signals output by the current sensors 43 and 44 respectively, whereas the rotor rotation position θ1 is a signal output by the rotor rotation position sensor 40.

At this time, a current vector is controlled so as to change only the input power (or reactive power) different from the power required for generation of the torque of the second AC motor 14. Thus, the system voltage control is executed in order to suppress variations in the system voltage by adjusting an input power to the second MG unit 30 (second AC motor 14) while sustaining the torque generated by the second AC motor 14 at a constant value (torque command value T2*).

Specifically, first of all, the signal output by the rotor rotation position sensor 40 as a signal representing the rotor rotation position θ2 of the second AC motor 14 is supplied to a second rotation speed computation unit 48 for computing a rotation speed N2 of the second AC motor 14. Then, in order to apply current feedback control to each of a d-axis current id2 and a q-axis current iq2 independently of each other in a d-q coordinate system set as a rotation coordinate system of the rotor of the second AC motor 14, a second torque control current computation unit 49 computes a torque control current vector it2* representing a d-axis torque control current idt2* and a q-axis torque control current iqt2* by using typically map data or a mathematical equation as a vector according to a torque command value T2* and rotation speed N2 of the second AC motor 14.

Then, a system voltage target value computation unit 50 serving as a target value computation means computes a target value Vs* of the system voltage, whereas the voltage sensor 25 supplies a detection value Vs of the system voltage to a first low pass filter 51 serving as a first low-frequency component passing means for carrying out a low pass filtering process to pass only components included in the detection value Vs of the system voltage as components each having a low frequency. Subsequently, a subtractor 52 computes a difference ΔVs between the target value Vs* of the system voltage and a detection value Vsf output by the low pass filtering process as the detection value of the system voltage, supplying the difference ΔVs to the a P-I controller 53 serving as a power operation amount computation means for computing an electric input power operation amount Pm of the second AC motor 14 as an amount that reduces the difference ΔVs between the target value Vs* of the system voltage and the detection value Vsf output by the low pass filtering process as the detection value of the system voltage by execution of P-I control.

Figure 4:
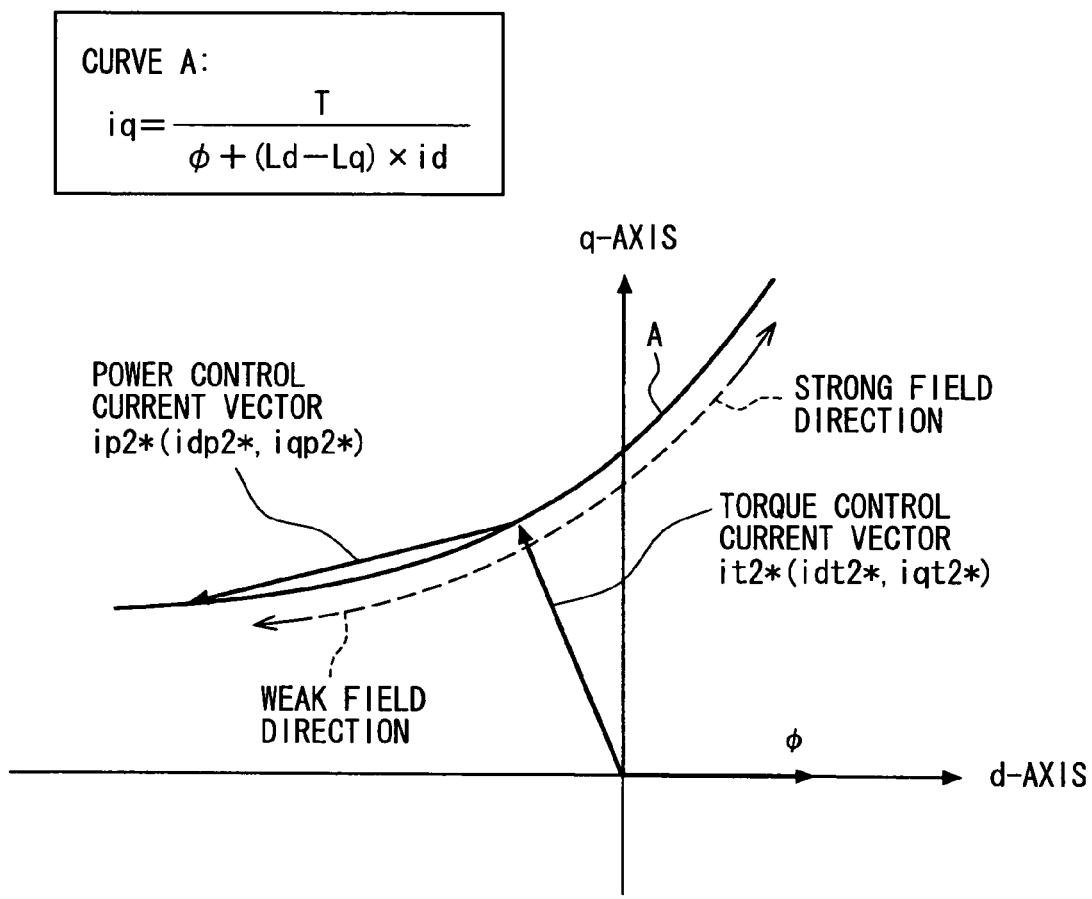
FIG. 4 is a graph showing a characteristic of a current vector used for computing a command current vector in the embodiment.

The input electric power operation amount Pm is input to an inhibit/permit gate 72. Upon receipt of a ready signal from the main control unit 31, the input electric power operation amount Pm is permitted to be output to an input electric power control current computation unit 54. Upon inputting the input electric power operation amount Pm to the input electric power control current computation unit 54, a command current vector ip2* (d-axis command current idp2*, q-axis command current iqp2*) for input electric power control is computed in a manner as described below to vary the reactive power that does not contribute to producing the torque of the second AC motor 14 by the input electric power operation amount Pm as shown in FIG. 4.

First, the d-axis command current idp2* for input electric power control which is dependent upon the input electric power operation amount Pm and upon the command current vector it2* (d-axis command current idt2*, q-axis command current iqt2*) for torque control, is computed by using a map or a numerical formula, and the q-axis command current iqp2* for input electric power control is operated by using the d-axis command current idp2* for input electric power control.

$$iqp2^* = [(Ld-Lq) \times idp2^* \times iqt2^*]/[(Ld-Lq) \times (idp2^* + idt2^*) + \Phi]$$

where Φ is a magnetic flux linkage, Ld is a d-axis inductance, and Lq is a q-axis inductance, which are device constants of the AC motor 14.

Thus, the command current vector ip2*(d-axis command current idp2*, q-axis command current iqp2*) for input electric power control is computed to vary the input electric power (reactive power) to the second AC motor 14 by the input electric power operation amount Pm while maintaining the torque of the second AC motor 14 (torque command value T2*) substantially constant.

Figure 5:
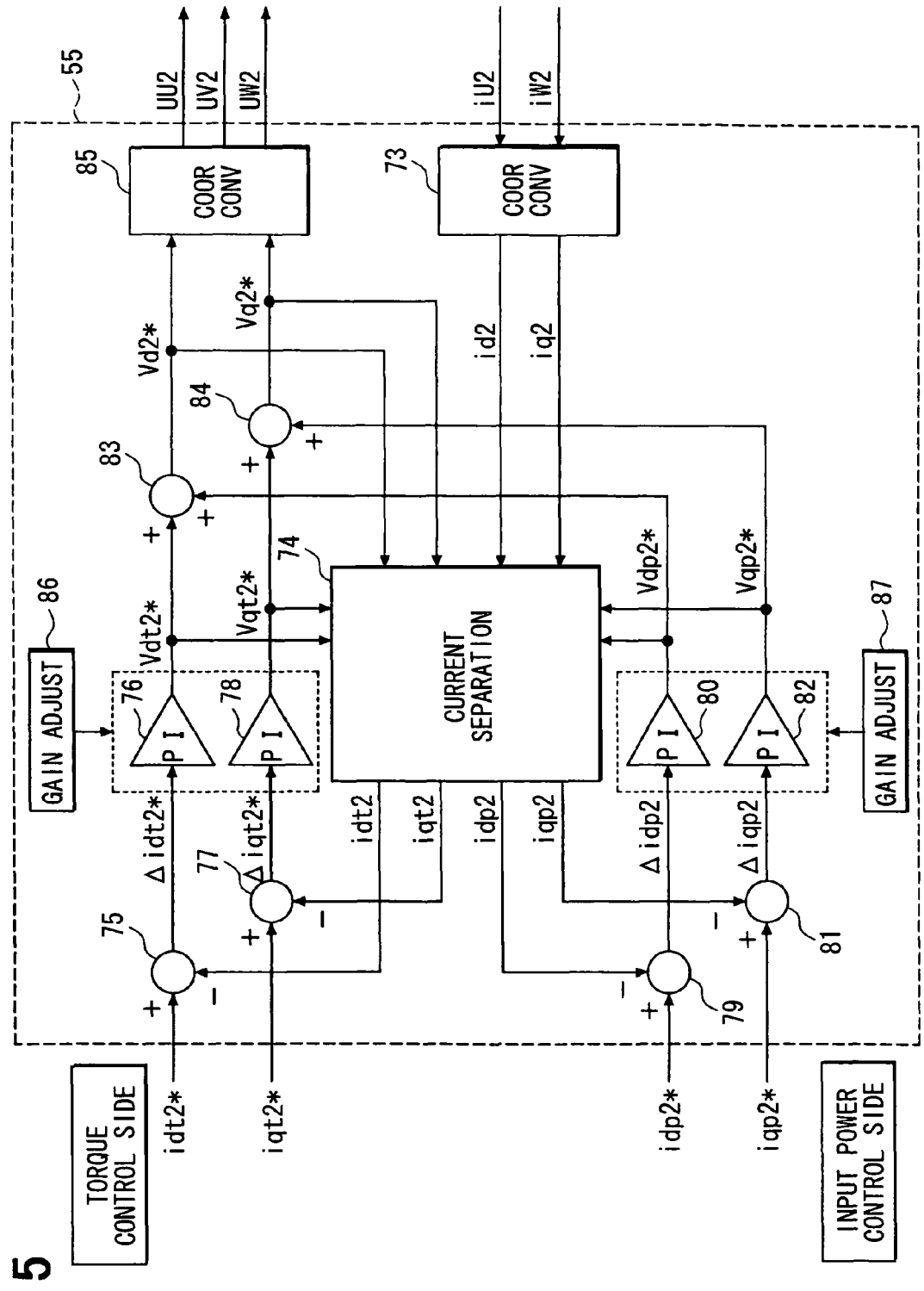
FIG. 5 is a block diagram showing a second current control part in the embodiment.

Thereafter, the command current vector it2* (d-axis command current idt2*, q-axis command current iqt2*) for torque control and the command current vector ip2* (d-axis command current idp2*, q-axis command current iqp2*) for input electric power control, are input to a second current control unit 55 (current control means) shown in FIG. 5. In this second current control unit 55, a coordinate converter unit 73 computes a motor detection current vector i2 (d-axis motor detection current id2, q-axis motor detection current iq2) which is a detection value of current actually flowing into the second AC motor 14 based on the currents iU2 and iW2 of U-phase and W-phase of the second AC motor 14 (output signals of the current sensors 43 and 44) and on the rotation position θ2 of the rotor of the second AC motor 14 (output signal of the rotor rotation position sensor 40).

Thereafter, in order to control the torque of the second AC motor 14 and to control the electric power input to the second AC motor 14 independently from each other, a current separation unit 74 (current separation means) separates the detected motor current vector i2 (d-axis detected motor current id2, q-axis detected motor current iq2) into a detection current vector it2 (d-axis detection current idt2, q-axis detection current iqt2) for torque control related to the torque control and a detection current vector ip2 (d-axis detection current idp2, q-axis detection current iqp2) for input electric power control related to the input electric power control.

Figure 6:
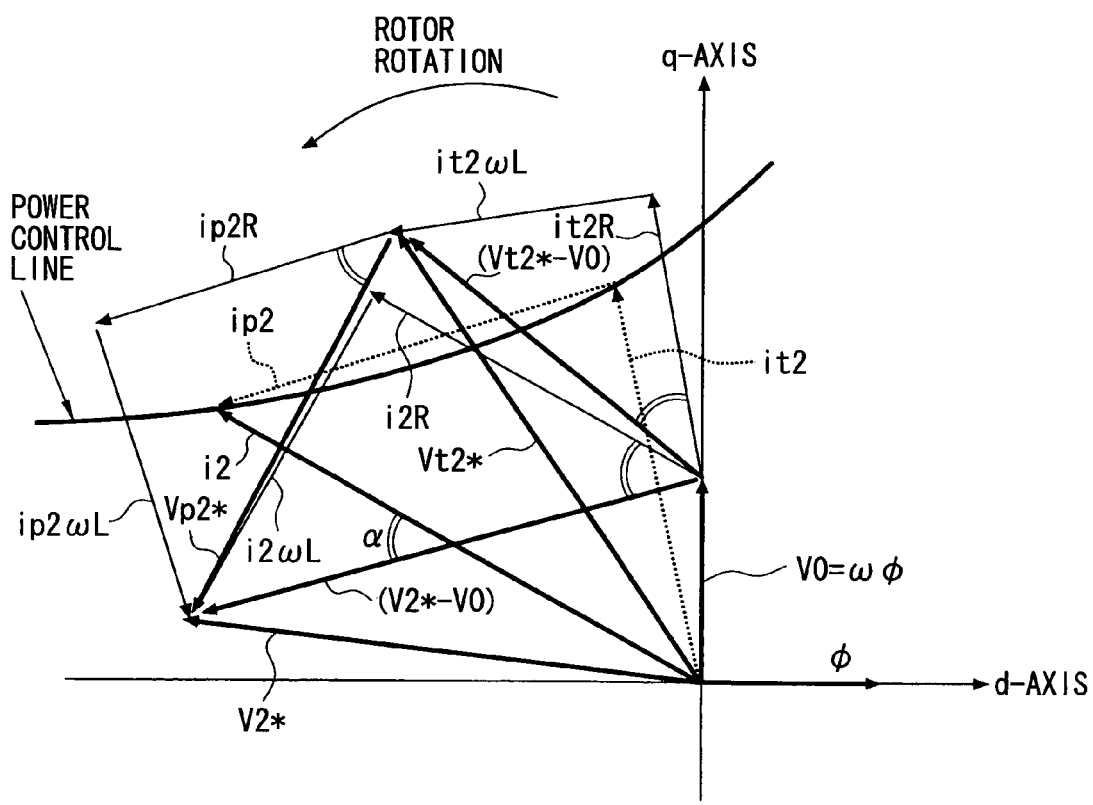
FIG. 6 is a graph showing method of calculating detection current vectors for torque control and input power control.

FIG. 6 shows a method of separating the detected motor current vector i2 into the detection current vector it2 for torque control and the detection current vector ip2 for input electric power control. Here, ω denotes an electric angular velocity, L denotes an inductance, R denotes an armature winding resistance and Φ denotes an interlinking magnetic flux. The motor command voltage vector V2* is a voltage vector obtained by adding a command voltage vector Vp2* for input electric power control to the command voltage vector Vt2 for torque control, and the voltage vector V0 is a voltage vector computed by multiplying the electric angular velocity ω by the magnetic flux linkage Φ.

At a moment when the phase difference is α between the voltage vector (V2*–V0) and the current vector i2, and R and ωL are not almost changing, a triangle A formed by the three current vectors i2, it2 and ip2 is similar to a triangle B formed by the three voltage vectors (V2*–V0), (Vt2*–V0) and Vp2*. Therefore, the similarity ratio R of the triangle A by the current vectors to the triangle B by the voltage vectors becomes a value obtained by dividing the length of the current vector i2 by the length of the voltage vector (V2*–V0).

$$R = |i2|/|V2^* - V0|$$

That is, the triangle A formed by the three current vectors i2, it2 and ip2 is a triangle which works to advance the angle by α in the direction of each side of the triangle B formed by the three voltage vectors (V2*–V0), (Vt2*–V0) and Vp2*, and to lengthen each side by R times.

It is, therefore, possible to compute the detection current vector it2 (d-axis detection current idt2, q-axis detection current iqt2) for torque control by computing a vector that advances the angle by α in the direction of the voltage vector (Vt2*–V0) and lengthens the length thereof by R times. It is, further, possible to compute the detection current vector ip2 (d-axis detection current idp2, q-axis detection current iqp2) for input electric power control by finding a vector that advances the angle by α in the direction of the voltage vector Vp2* and lengthens the length thereof by R times.

After the detected motor current vector i2 is separated into the detection current vector it2 for torque control and the detection current vector ip2 for input electric power control, a subtractor 75 computes a difference Δidt2 between the d-axis command current idt2* for torque control and the d-axis detection current idt2 as shown in FIG. 5. The difference Δidt2 is input to a P-I controller 76 which computes a d-axis command voltage Vdt2* for torque control by the P-I control so that the difference Δidt2 decreases. Further, a subtractor 77 computes a difference Δiqt2 between the q-axis command current iqt2* for torque control and the q-axis detection current iqt2, and the difference Δiqt2 is input to a P-I controller 78 which computes a q-axis command voltage Vqt2* for torque control by the P-I control so that the difference Δiqt2 decreases. Thus, a command voltage vector Vt2* (d-axis command voltage Vdt2*, q-axis command voltage Vqt2*) for torque control is computed to decrease the difference between the command current vector it2* for torque control and the detection current vector it2.

Further, a subtractor 79 computes a difference Δidp2 between the d-axis command current idp2* for input electric power control and the d-axis detection current idp2, and the difference Δidp2 is input to a P-I controller 80 which computes a d-axis command voltage Vdp2* for input electric power control by the P-I control or the like so that the difference Δidp2 decreases. Further, a subtractor 81 computes a difference Δiqp2 between the q-axis command current iqp2* for input electric power control and the q-axis detection current iqp2, and the difference Δiqp2 is input to a P-I controller 82 which computes a q-axis command voltage Vqp2* for input electric power control by the P-I control or the like so that the difference Δiqp2 decreases. Thus, a command voltage vector Vp2* (d-axis command voltage Vdp2*, q-axis command voltage Vqp2*) for input power control is computed to decrease the difference between the command current vector ip2* for input electric power control and the detection current vector ip2.

Thus, the command voltage vector Vt2* (d-axis command voltage Vdt2*, q-axis command voltage Vqt2*) for torque control and the command voltage vector Vp2* (d-axis command voltage Vdp2*, q-axis command voltage Vqp2*) for input electric power control, are independently computed. Thereafter, an adder 83 adds the d-axis command voltage Vdp2* for input electric power control to the d-axis command voltage Vdt2* for torque control to compute a final d-axis motor command voltage Vd2*, while an adder 84 adds the q-axis command voltage Vqp2* for input electric power control to the q-axis command voltage Vqt2* for torque control to compute a final motor q-axis command voltage vector Vq2*. Thus, the motor command voltage vector V2* (d-axis motor command voltage Vd2, q-axis motor command voltage Vq2*) is determined. V2* (d-axis motor command voltage Vd2, q-axis motor command voltage Vq2*) is converted through a coordinate converter unit 85 into three-phase voltage command signals UU2, UV2 and UW2, which are output to a second inverter 28 of these three-phase voltage command signals UU2, UV2 and UW2.

As described above, the torque control is executed to control the torque of the second AC motor 14 so as to realize the torque command value T2* output from the main control unit 31. Further, while maintaining the torque of the second AC motor 14 constant (torque command value T2*), the system voltage stabilization control is executed to suppress variation in the system voltage so that a difference ΔVs between the target value Vs* of the system voltage and the detection value Vsf is reduced by executing the input electric power control to vary the electric power (reactive power) input to the second MG unit 30 (second AC motor 14). In this case, the P-I controller 53, the input electric power control current computation unit 54 and the like units operates as system voltage control means.

Figure 7:
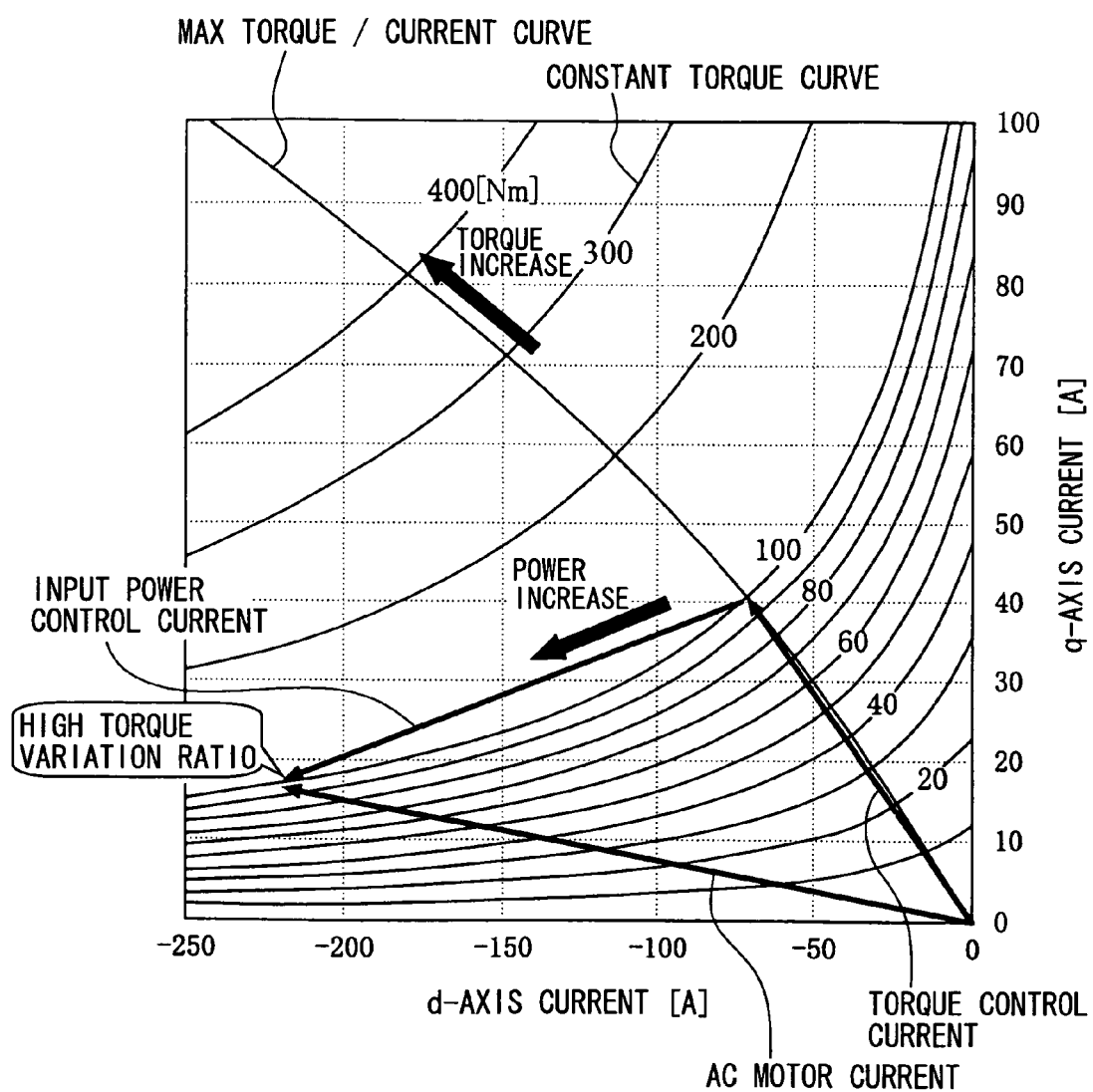
FIG. 7 is a graph showing a relation between an input electric power control amount and a torque variation rate.

Here, as shown in FIG. 7, in executing system voltage stabilization control, when the current vector for input power control of the second MG unit 30 is controlled in the weak magnetic field direction (FIG. 4) relative to the maximum torque/current curve (a curve along which a torque is generated most efficiently relative to the same current), a torque variation rate in the q-axis direction (torque sensitivity: a torque variation amount relative to the q-axis current variation amount) tends to become larger as the current vector for input power control becomes larger with an increase in the input electric power control amount. When the current vector for input power control of the second MG unit 30 is controlled in the strong magnetic field direction (FIG. 4), a torque variation rate in the d-axis direction (a torque variation amount relative to the d-axis current variation amount) tends to become larger as the current vector for input power control becomes larger with an increase in the input electric power control amount. If the torque variation rate thus becomes larger, the torque variation due to current variation becomes larger and the stability of torque control is likely to decrease.

To counter this problem, as shown in FIG. 5, the second current control unit 55 adjusts the current control gain for torque control in accordance with the input electric power control amount of the second MG unit 30 by a gain adjusting unit 86 (current control gain adjusting means). As a result, the current control gains of the q-axis current and the d-axis current for torque control are varied in accordance with the variations of the torque variation rates in the q-axis direction and the d-axis direction due to the change in the current vector for input power control caused by the input electric power control amount of the second MG unit 30.

Figure 8:
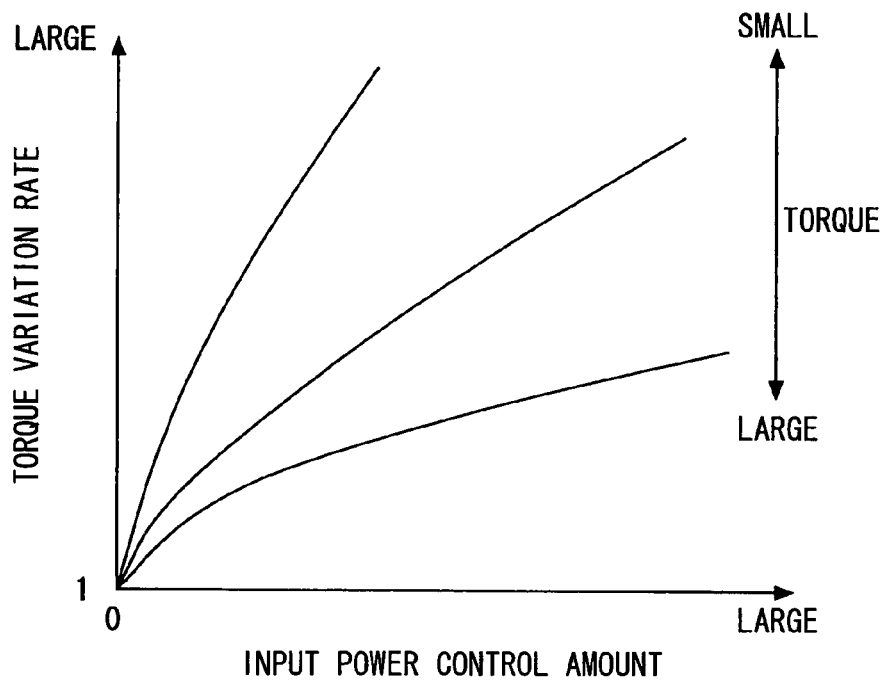
FIG. 8 is a graph showing a relation among an input electric power control amount, a torque and a torque variation rate.
Figure 9:
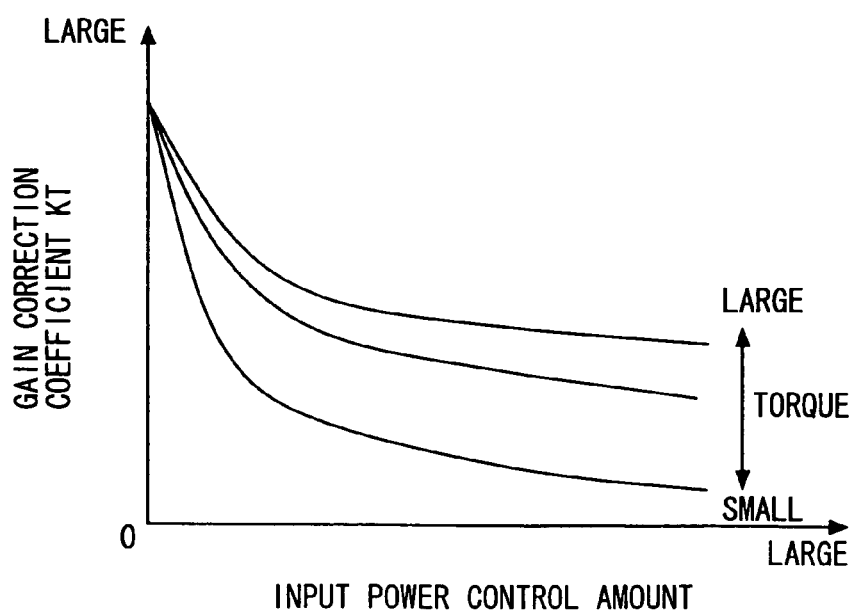
FIG. 9 is a graph showing schematically an example of a data map defining a gain correction coefficient for torque control.

More specifically, by referring to map data of a gain correction coefficient KT for torque control shown in FIG. 9, the gain correction coefficient KT for torque control is calculated in accordance with the detection value of the input electric power control amount of the second MG unit 30. The detection value may be for example the input electric power control amount calculated from the detection current vector ip2, etc for input power control. As shown in FIG. 8, the torque variation rate in the q-axis direction or the d-axis direction increase as the input electric power control amount of the second MG unit 30, and the torque variation rates in the q-axis direction and the d-axis direction increase as the torque of the second AC motor 14. The torque variation rate in FIG. 8 is a converted ratio by setting the torque variation rated to one (1) when the input electric power control amount is zero (0), in which the current vector of the AC motor 14 is on the maximum torque/electric power curve line. Based on this characteristic, the gain correction coefficient KT for torque control is set to decrease as the input electric power control amount of the second MG unit 30 increases and the torque variation rate decreases. The correction coefficient KT is set to decrease as the torque of the second AC motor 14 decreases and the torque variation rate increases.

When the current vector for the input power control of the second MG unit 30 in the weak magnetic field direction after the gain correction coefficient KT for torque control is thus determined, the proportional (P) gain and the integral (I) gain are corrected by respectively multiplying the gain correction coefficient KT for torque control in calculating the q-axis command voltage Vqt2* for torque control to reduce the difference Δiqt between the q-axis command current iqt2* for torque control and the q-axis detection current iqt2 by the P-I control in the P-I control unit 78 (FIG. 5). Thus, when controlling the current vector for input power control of the second MG unit 30 in the weak magnetic field direction, the current control gain of the q-axis current for torque control is decreased in correspondence to the increase of the torque variation rate in the q-axis direction due to the increase in the input electric power control amount. As a result, the torque variation duet to variation in the q-axis current is suppressed.

When the current vector for the input power control of the second MG unit 30 in the weak magnetic field direction, on the other hand, the proportional (P) gain and the integral (I) gain are corrected by respectively multiplying the gain correction coefficient KT for torque control in calculating the d-axis command voltage Vdt2* for torque control to reduce the difference Δidt between the d-axis command current idt2* for torque control and the d-axis detection current idt2 by the P-I control in the P-I control unit 76 (FIG. 5). Thus, when controlling the current vector for input power control of the second MG unit 30 in the strong magnetic field direction, the current control gain of the d-axis current for torque control is decreased in correspondence to the increase of the torque variation rate in the d-axis direction due to the increase in the input electric power control amount. As a result, the torque variation duet to variation in the d-axis current is suppressed.

Figure 10:
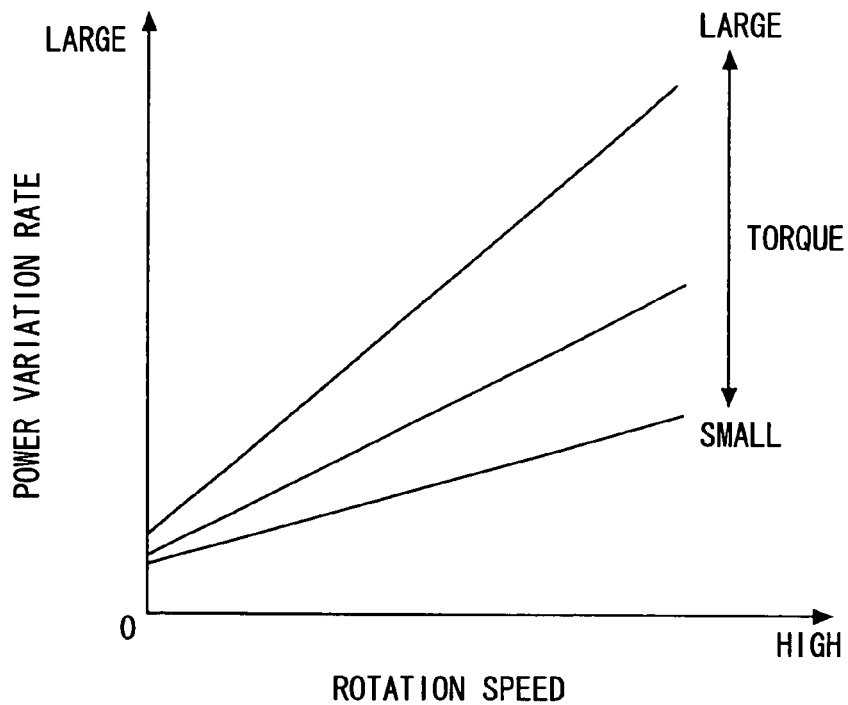
FIG. 10 is a graph showing a relation among a rotation speed, a torque and a power variation rate.
Figure 12:
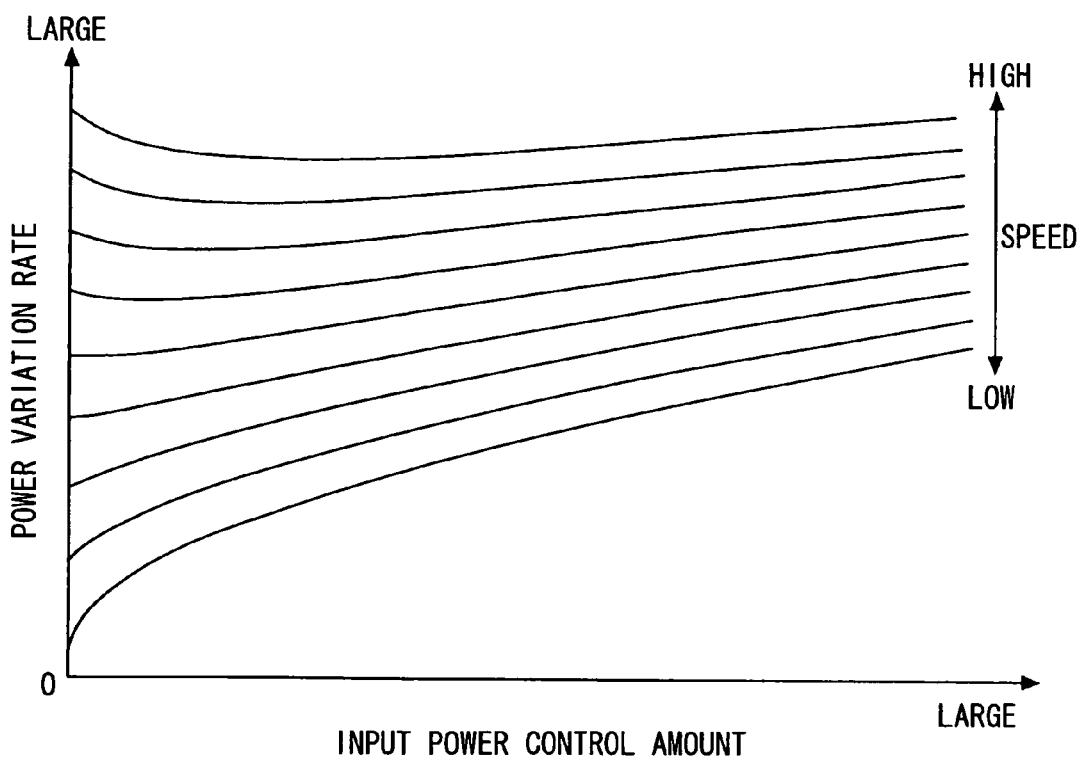
FIG. 12 is a graph showing a relation among an input electric power control amount, a rotation speed and a power variation rate.

Further, as shown in FIG. 10, an electric power variation rate (power sensitivity: an electric power variation amount relative to the current variation amount) increases as the rotation speed and the torque of the second AC motor 14 increases in performing the system voltage stabilization control. In addition, as shown in FIG. 12, the power variation rate also changes in accordance with the input electric power control amount. As the power variation rate increases, the electric power variation due to the current variation increases. As a result, it is likely that the stability of the electric power control is lowered.

Therefore, as shown in FIG. 5, the second current control unit 55 adjusts the current control gain for input electric power control by a gain adjusting unit (current control gain adjusting means) 87 in accordance with the rotation speed, the torque and the input electric power control amount of the second AC motor 14. As a result, the current control gain for input power control is adjusted in accordance with the rotation speed, the torque and the input electric power control amount of the second AC motor 14.

Figure 11:
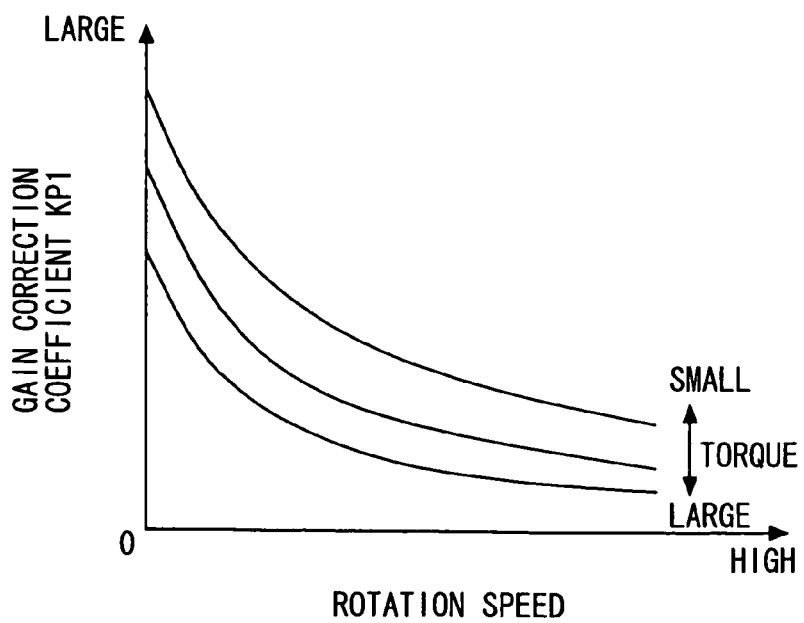
FIG. 11 is a graph showing schematically an example of a data map defining a gain correction coefficient for input power control.

Specifically, by referring to map data of the gain correction coefficient KP1 for input electric power control shown in FIG. 11, the gain correction coefficient KP1 is calculated in accordance with the detection value of the rotation speed and the detection value of the torque (for example, torque calculated from the detection current vector it2 for torque control, etc.) of the second AC motor 14. As shown in FIG. 10, the electric power variation rate increases as the rotation speed of the second AC motor 14 increases or as the torque of the second AC motor 14 increases. Based on this characteristic, as shown in FIG. 11, the gain correction coefficient KP1 for input electric power control is set to decrease as the rotation speed of the second AC motor 14 increases and the electric power variation rate increases. The gain correction coefficient KPI is also set to decrease as the torque of the AC motor 14 increases and the electric power variation rate increases.

Figure 13:
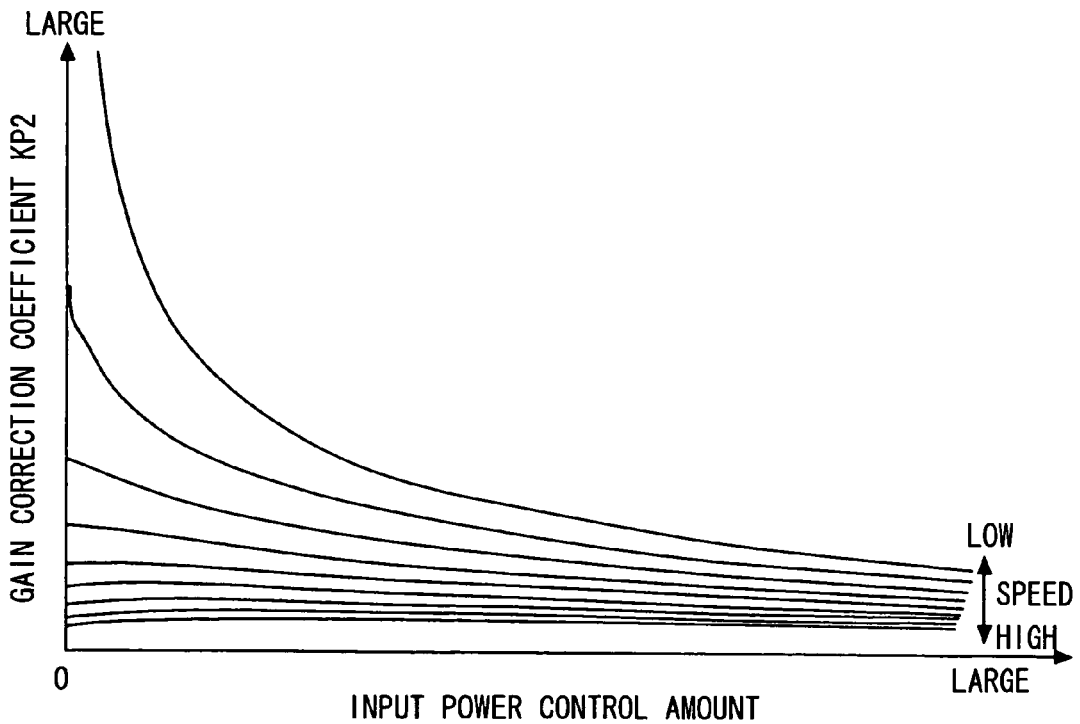
FIG. 13 is a graph showing schematically an example of a data map defining a gain correction coefficient for input power control.

Further, by referring to map data of the gain correction coefficient KP2 for input power control shown in FIG. 13, the gain correction coefficient KP2 is calculated in accordance with the detection value of the input power control amount (for example, input electric power control amount calculated from the detection current vector it2 for input electric power control, etc.). As shown in FIG. 12, the electric power variation rate varies with the input electric power control amount and increases as the rotation speed of the second AC motor 14 increases. Based on this characteristic, as shown in FIG. 13, the gain correction coefficient KP2 for input electric power control is set to change as the input electric power control amount. The gain correction coefficient KP2 is also set to decrease as the rotation speed of the AC motor 14 increases and the electric power variation rate increases.

After the gain correction coefficients KP1 and KP2 for input electric power control are thus determined, the proportional (P) gain and the integral (I) gain are corrected by respectively multiplying both of the gain correction coefficients KP1 and KP2 for input electric power control in calculating the q-axis command voltage Vqt2* for input electric power control to reduce the difference Δqp2 between the q-axis command current iqt2* for input electric power control and the q-axis detection current iqt2 by the P-I control in the P-I control unit 82 (FIG. 5). In addition, the proportional (P) gain and the integral (I) gain are corrected by respectively multiplying both of the gain correction coefficients KP1 and KP2 for input electric power control in calculating the d-axis command voltage Vdt2* for input electric power control to reduce the difference Δdp2 between the d-axis command current idt2* for input electric power control and the d-axis detection current idt2 by the P-I control in the P-I control unit 80 (FIG. 5). Thus, by changing the current control gain for input power control in accordance with the variation in the electric power variation rate due to variations of the rotation speed, the torque and the input electric power control amount of the second AC motor 14, the electric power variation due to the variation of current for input electric power control is suppressed.

In the above correction operation, it is possible to use a data map that defines the gain correction coefficient KP for input electric power control based on three parameters, that are, the rotation speed, the torque and the input electric power control amount of the second AC motor 14. With this data map, the gain correction coefficient KP for input electric power control may be calculated based on the rotation speed and the torque of the second AC motor 14 and the input electric power, the current control gain of the q-axis current and the current control gain of the d-axis current may be corrected by this gain correction coefficient. Alternatively, the current control gain of the q-axis current and the current control gain of the d-axis current for input electric power control may be determined based on the rotation speed, the torque and the input electric power control amount of the second AC motor 14.

(Conversion Voltage Control)

Right after the start of system operation but before completion of pre-charging the smoothing capacitor 24, the motor control unit 37 executes the conversion voltage control to control the output voltage of the voltage boosting converter 21 so as to decrease the difference $\Delta Vs$ between the target value $Vs^*$ and the detection value Vsf of the system voltage.

Specifically referring to FIG. 3, the system voltage target value computation unit 50 computes the target value $Vs^*$ of the system voltage, the system voltage Vs detected by the voltage sensor 25 is input to the first low pass filter 51 to execute the low pass filtering process permitting the passage of components in a low-frequency region only of the detected system voltage Vs. Thereafter, a subtractor 68 computes the difference $\Delta Vs$ between the target value $Vs^*$ of the system voltage and the detection value Vsf of the system voltage after being subjected to the low pass filtering. The difference $\Delta Vs$ is input to a P-I controller 69 (conversion voltage control amount computing means), and a current duty ratio Dvc of a switching element that is not shown in the voltage boosting converter 21 is computed by P-I control so as to decrease the difference $\Delta Vs$ between the target value $Vs^*$ of the system voltage and the detection value Vsf of the system voltage after being subjected to the low pass filtering.

The current duty ratio Dvc for voltage control and the current duty ratio Dpc for power control that will be described later are input to a voltage boosting drive selection and computation unit 70, which operates as a selector means. After the start of the system, the voltage boosting drive selection and computation unit 70 determines whether the ready signal from the main control unit 31 has been received. When it is determined that the ready signal has not been received, it is so determined that the smoothing capacitor 24 has not yet been sufficiently pre-charged, and the current duty ratio Dvc for voltage control is selected as a current duty ratio Dc of the switching element in the voltage boosting converter 21 to thereby execute the conversion voltage control by the voltage boosting converter 21.

Dc=Dvc

Thereafter, a voltage boosting drive signal computation unit 71 computes voltage boosting drive signals UCU, UCL based on the current duty ratio Dc (=Dvc) for power control, and the voltage boosting drive signals UCU and UCL are output to the voltage boosting converter 21.

Right after the start of system operation but before the smoothing capacitor 24 has been sufficiently pre-charged, the conversion voltage control is executed to control the output voltage of the voltage boosting converter 21 so as to decrease the difference $\Delta Vs$ between the target value $Vs^*$ and the detection value Vsf of the system voltage. The smoothing capacitor 24 is, thereafter, sufficiently pre-charged so that the system voltage is quickly controlled to become the target value. During this conversion voltage control, the system voltage control (system voltage stabilization control) by operating the input power of the second MG unit 30 is prohibited. As a result, interference between the system voltage control (system voltage stabilization control) and the system voltage control (conversion voltage control) is restricted. In this case, the P-I controller 69, the voltage boosting drive selection and computation unit 70 and the voltage boosting drive signal computation unit 71 operate as a conversion voltage control means.

(Conversion Power Control)

After the start of system operation and the smoothing capacitor 24 has been sufficiently pre-charged, the motor control unit 37 halts the above conversion voltage control, and changes the operation over to conversion power control to control the output voltage of the voltage boosting converter 21 so as to decrease the difference $\Delta Pi$ between the command value Pif* and the detection value Pi of electric power output by the boosting converter 21.

When the command value Pif* of electric power output from the boosting converter 21 is to be computed, first, as shown in FIG. 3, the torque command value T1* and the rotation speed N1 of the first AC motor 13 are input to a first shaft output computation unit 56 to compute a shaft output PD1 of the first AC motor 13. Further, the torque command value T1* and the rotation speed N1 of the first AC motor 13 are input to a first output loss computation unit 57 to compute an output loss PL1 of the first AC motor 13. Thereafter, an adder 58 adds the output loss PL1 to the shaft output PD1 of the first AC motor 13 to compute an input power Pi1 to the first AC motor 13. In this case, when the first AC motor 13 is operating as a generator, the computation result of input power Pi1 to the first AC motor 13 assumes a negative value.

Further, the torque command value T2* and the rotation speed N2 of the second AC motor 14 are input to a second shaft output computation unit 59 to operate a shaft output PD2 of the second AC motor 14. Further, the torque command value T2* and the rotation speed N2 of the second AC motor 14 are input to a second output loss computation unit 60 to compute an output loss PL2 of the second AC motor 14. Thereafter, an adder 61 adds the output loss PL2 to the shaft output PD2 of the second AC motor 14 to compute an input power Pi2 to the second AC motor 14. In this case, when the second AC motor 14 is operating as a generator, the computation result of input power Pi2 to the second AC motor 14 assumes a negative value.

Thereafter, the input power Pi1 to the first AC motor 13 and the input power Pi2 to the second AC motor are added up together through an adder 62 to compute a total electric power Pi*. The total electric power Pi* is input to a second low pass filter 63 (second low frequency component passing means) so as to be subjected to the low pass filtering process permitting the passage of components in a low-frequency region only of the total electric power Pi*. The total electric power Pif* after being subjected to the low pass filtering is regarded to be the command value Pif* for the conversion power. The adder 62 and the second low pass filter 63 operate as conversion power command value computation means.

When a detection value Pi of electric power output from the voltage boosting converter 21 is to be computed, a detection value ic of current output from the voltage boosting converter 21 detected by the current sensor 26 is input to a third low pass filter 64 (third low frequency component passing means) and is subjected to the low pass filtering process permitting the components in the low-frequency region only to pass through in the detection value ic of current output from the voltage boosting converter 21. A conversion power detection unit 65 multiplies the target value Vs* of the system voltage by the detection value icf of current output from the voltage boosting converter 21 after having been subjected to the low pass filtering in order compute a detection value Pi of the conversion power. The detection value Vsf of the system voltage may be multiplied by the detection value icf of the output current to compute the detection value Pi of the output power.

Thereafter, a difference ΔPi between the command value Pif* and the detection value Pi of electric power output from the voltage boosting converter 21 is computed by a subtractor 66. The difference ΔPi is input to a P-I controller 67 (conversion power control amount computation means), and a current duty ratio Dpc of a switching element (not shown) in the voltage boosting converter 21 is computed by P-I control so as to decrease the difference ΔPi between the command value Pif* and the detection value Pi of electric power output from the voltage boosting converter 21.

The current duty ratio Dpc for power control and the current duty ratio Dvc for voltage control are input to the voltage boosting drive selection and computation unit 70, which operates as a selection means. The voltage boosting drive selection and computation unit 70 determines if the ready signal from the main control unit 31 has been received after the start of the system. When it is determined that the ready signal has been received already, it is so determined that the smoothing capacitor 24 has been pre-charged, and the current duty ratio Dpc for power control is selected as a current duty ratio Dc for the switching element in the voltage boosting converter 21 so as to execute the conversion power control by the voltage boosting converter 21.

$$Dc=Dpc$$

Thereafter, based on the current duty ratio Dc (=Dpc) for power control, the voltage boosting drive signal computation unit 71 computes voltage boosting drive signals UCU and UCL, and outputs the voltage boosting drive signals UCU and UCL to the voltage boosting converter 21.

After the smoothing capacitor 24 has been pre-charged as described above, the conversion power control is executed to control the electric power output from the voltage boosting converter 21 so as to decrease the difference ΔPi between the command value Pif* and the detection value Pi of electric power output from the voltage boosting converter 21. Thus, the electric power supplied to the power line 22 by the voltage boosting converter 21 can be controlled as desired. In this case, the P-I controller 67, the voltage boosting drive selection and computation unit 70 and the voltage boosting drive signal computation unit 71 operate as a conversion power control means.

Figure 14:
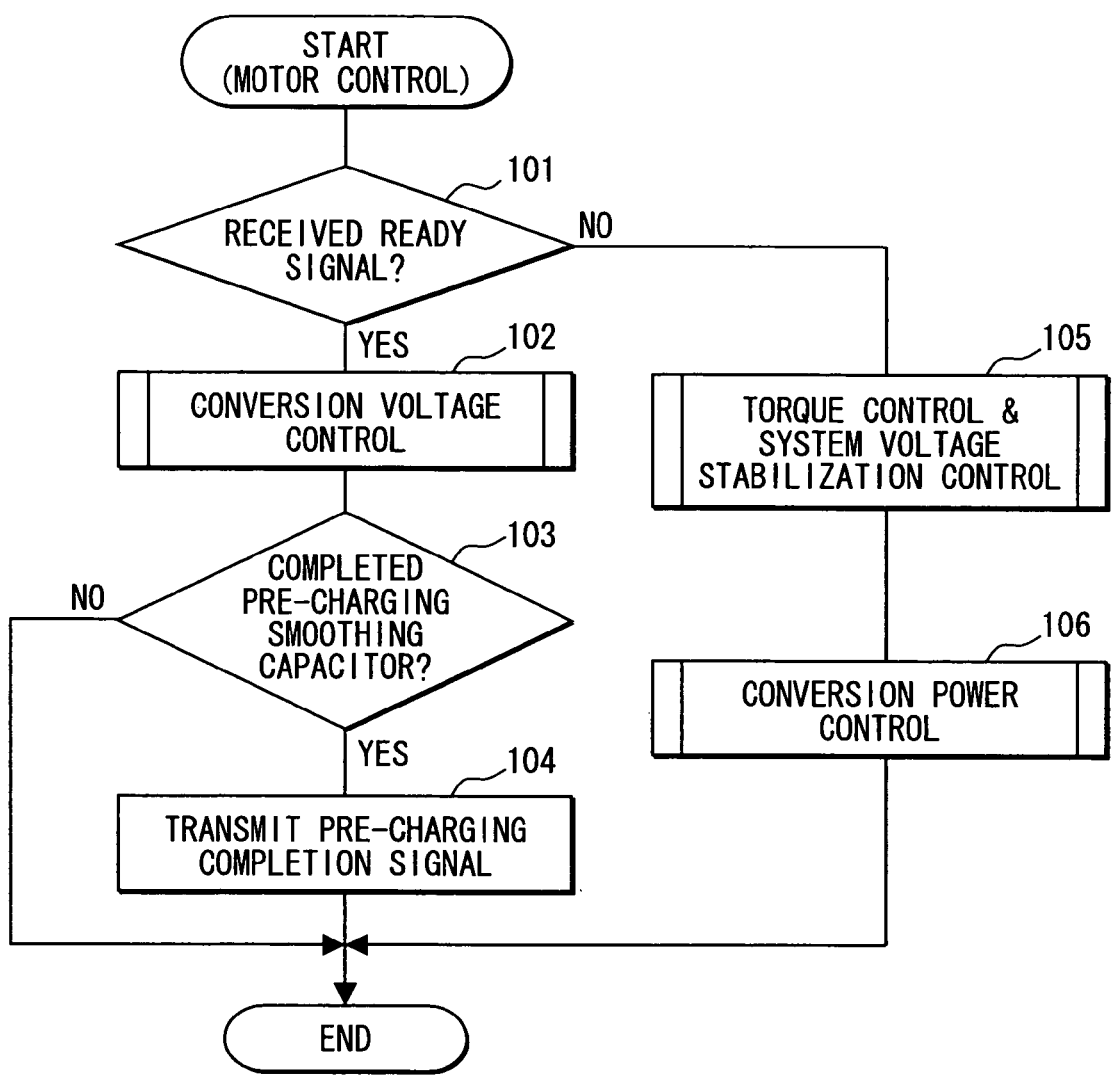
FIG. 14 is a flow chart showing processing of a motor control main program.

The above motor control (torque control, system voltage stabilization control), conversion voltage control and conversion power control are executed according to a main motor control program shown in FIG. 14. This program is repetitively executed at a predetermined interval after the start of system operation. When the program starts, it is determined at step 101, first, if the ready signal is received from the main control unit 31. When it is determined that the ready signal has not been received, it is so determined that the smoothing capacitor 24 has not been sufficiently pre-charged yet. The routine proceeds to step 102, where the conversion voltage control is executed to so control the output voltage of the voltage boosting converter 21 that the difference ΔVs between the target value Vs* and the detection value Vsf of the system voltage decreases. As a result, the smoothing capacitor 24 is pre-charged to quickly control the system voltage so as to assume the target value. While the conversion voltage control at step 102 is being executed, the system voltage control (system voltage stabilization control at step 105) by computing the input power to the second MG unit 30 is prohibited.

The routine, thereafter, proceeds to step 103 to determine whether the smoothing capacitor 24 has been sufficiently pre-charged. When it is determined that the pre-charging the smoothing capacitor 24 has been completed (sufficiently pre-charged), the routine proceeds to step 104 where a pre-charge completion signal is transmitted to the main control unit 31.

When it is determined based on the pre-charge completion signal or other signals that the motor control system needs no longer be placed in the shut-down state, the main control unit 31 transmits the ready signal to the control unit 37.

Thereafter, when it is determined at step 101 that the ready signal is received from the main control unit 31, it is so determined that the smoothing capacitor 24 has been sufficiently pre-charged. The routine then proceeds to step 105 where the motor control system is no longer placed in the shut-down state, and the motor control (torque control, system voltage stabilization control) is executed. At step 106, the conversion voltage control is changed over to the conversion power control, and the output power of the voltage boosting converter 21 is so controlled as to decrease the difference ΔPi between the command value Pif* and the detection value P1 of the electric power output from the voltage boosting converter 21.

As described above, the present embodiment provides the following advantages.

The input power to the second MG unit 30 (second AC motor 14) is so controlled that the difference ΔVs decreases between the target value Vs* and the detection value Vsf of the system voltage to execute the system voltage stabilization control in order to suppress variation in the system voltage of the power supply line 22. Therefore, even when the power balance greatly varies between the two AC motors 13 and 14 due to changes in the operating conditions of the vehicle, the system voltage can be effectively stabilized. Besides, the voltage of the power supply line 22 can be highly stabilized without using the voltage boosting converter 21 of high performance or without using the smoothing capacitor 24 of a large capacity, satisfying the requirement of realizing the system in a small size and at a decreased cost.

Further, the detected motor current vector i2 is separated into a detection current vector it2 for torque control and the detection current vector ip2 for input electric power control, the command voltage vector Vt2* is computed for torque control so that the difference decreases between the command current vector it2* for torque control and the detection current vector it2, and the command voltage vector Vp2* is computed for input electric power control so that the difference decreases between the command current vector ip2* for input electric power control and the detection current vector ip2. Then, the command voltage vector Vt2* for torque control and the command voltage vector Vp2* for input electric power control are computed independently from each other. The final motor command voltage is computed based upon the command voltage vector Vt2* for torque control and on the command voltage vector Vp2* for input electric power control to thereby control the torque of the second AC motor 14 and the electric power input to the second MG unit 30 independently from each other. This prevents the interference between controlling the torque of the second AC motor 14 and controlling the electric power input to the second MG unit 30, and helps stabilize the torque control for the second AC motor 14 and the input electric power control for the second MG unit 30.

In the system voltage stabilization control, the current vector is so controlled as to vary only the reactive power that does not contribute to producing the torque of the second AC motor 14 to thereby control the system voltage by controlling the input power to the second AC motor 14, while maintaining the torque of the second AC motor 14 constant (at the torque command value T2*). Therefore, variation in the system voltage can be suppressed without adversely affecting the operating condition of the vehicle.

In the system voltage stabilization control, the current vector is controlled so that only the ineffective electric power that does not contribute to generation of torque of the second AC motor 14 changes. As a result, the system voltage is controlled by controlling the input electric power of the second MG unit 30 (second AC motor 14) while maintaining the torque of the second AC motor 14 at the substantially constant value (torque command value T2*). Thus, the system voltage is restricted from fluctuating without adversely affecting on the operating condition of the vehicle.

In the system voltage stabilization control, when the current vector for input electric power control of the second MG unit 30 is controlled in the weak magnetic field direction, the current control gain of the q-axis current for torque control is made smaller in correspondence that the torque variation rate in the q-axis direction becomes larger as the input electric power control amount increases. As a result, the torque variation due to the q-axis current variation can be lowered. When the current vector for input electric power control of the second MG unit 30 is controlled in the strong magnetic field direction, the current control gain of the d-axis current for torque control is made smaller in correspondence that the torque variation rate in the d-axis direction becomes larger as the input electric power control amount increases. As a result, the stability of torque control can be improved.

In the system voltage stabilization control, the current control gain for input electric power control is changed in correspondence that the electric power variation rate is varied in accordance with the rotation speed, the torque and the input electric power control amount of the second AC motor 14. As a result, the electric power variation due to variation of the current for input electric power control is suppressed and the stability of the electric power control is improved.

The present embodiment may be modified in the following way, for example.

In controlling the current vector for input electric power control of the MG unit 30 in the weak magnetic field direction, the current control gain of the q-axis current for torque control may be decreased and the current control gain of the d-axis current may be increased, as the input electric power control amount of the MG unit 30 increases. Alternatively, only the current control gain of the d-axis current may be increased.

In controlling the current vector for input electric power control of the MG unit 30 in the strong magnetic field direction, the current control gain of the d-axis current for torque control may be decreased and the current control gain of the q-axis current may be increased, as the input electric power control amount of the MG unit 30 increases. Alternatively, only the current control gain of the q-axis current may be increased.

The current control gain for torque control may be adjusted in accordance with the target value (input electric power operation amount Pm) of the input electric power control amount of the MG unit 30.

The current control gain for torque control may be adjusted in accordance with the detection value of the q-axis current (q-axis detection current iqp2) for input electric power control, the detection value of the d-axis current (d-axis detection current iqp2), the combined detection value of the combined q-axis current (combined q-axis detection current iq2) which is a combination of the q-axis current for torque control and the q-axis current for input electric power control, or the combined detection value of the combined d-axis current (combined d-axis detection current id2) which is a combination of the d-axis current for torque control and the d-axis current for input electric power control.

The current control gain for torque control may be adjusted in accordance with the target value of the q-axis current (q-axis command current iqp2*) for input electric power control, the target value of the d-axis current (d-axis command current iqp2*), the combined target value of the combined q-axis current (combined q-axis command current iq2*) which is a combination of the q-axis current for torque control and the q-axis current for input electric power control, or the combined target value of the combined d-axis current (combined d-axis command current id2*) which is a combination of the d-axis current for torque control and the d-axis current for input electric power control.

The current control gain for input electric power control may be adjusted in accordance with one or two of the three parameters, which are the rotation speed, the torque and the input electric power control amount of the second AC motor 14.

The current control gain for input electric power control may be adjusted in accordance with the target values of the rotation speed, the torque (torque command value T2*) and the input electric power control amount (input electric power operation amount Pm).

The system voltage stabilization may be performed by only the first MG unit 29 or by both of the first MG unit 29 and the second MG unit 30.

The above embodiments are directed to a hybrid vehicle of the so-called split type, which splits the motive power of the engine through the planetary gear mechanism. Not being limited to the hybrid vehicle of the split type, however, the embodiment may be hybrid vehicles of other types, such as a parallel type and a series type. In the above embodiment, further, the vehicle uses the AC motor and the engine as motive power sources. However, the vehicle may use the AC motor only as a motive power source. The vehicle may have only one MG unit comprising an inverter and an AC motor, or three or more MG units.

What is claimed is:

1. A control apparatus for an electric vehicle comprising:
a conversion means that converts a voltage supplied by a DC power source into a system voltage appearing on a power supply line;
an MG unit that includes an inverter connected to the power supply line and drives an AC motor;
a current control means that controls a torque of the AC motor and an input electric power of the MG unit independently from each other;
a system voltage control means that executes system voltage stabilization control to control the input electric power of the MG unit so as to suppress variation in the system voltage by sending to the current control means a command value for input electric power control; and
a current control gain adjusting means that adjusts at least one of a current control gain for torque control and a current control gain for input electric power control in accordance with a control state of the MG unit.

2. The control apparatus according to claim 1, wherein:
the current control gain adjusting means adjusts the current control gain for torque control in accordance with the input electric power control amount of the MG unit.

3. The control apparatus according to claim 2, wherein:
the current control gain adjusting means adjusts the current control gain for torque control in accordance with a target value or a detection value of at least one of the input electric power control amount, a q-axis current for input electric power control, a d-axis current for input electric power control, a combined q-axis current of the q-axis current for torque control and the q-axis current for input electric power control, and a combined d-axis current of the d-axis current for torque control and the d-axis current for input electric power control.

4. The control apparatus according to claim 1, wherein:
the current control gain adjusting means adjusts primarily the current control gain of the q-axis current for torque control when controlling the current for input electric power control toward a weaker magnetic field, and adjusts primarily the current control gain of the d-axis current for torque control when controlling the current for input electric power control toward a stronger magnetic field.

5. The control apparatus according to claim 1, wherein:
the current control gain adjusting means adjusts the current control gain for input electric power in accordance with at least one of a rotation speed, torque and input electric power control amount of the AC motor.

6. The control apparatus according to claim 5, further comprising:
the current control gain adjusting means adjusts the current control gain for input electric power in accordance with a target value or a detection value of at least one of a rotation speed, torque and input electric power control amount of the AC motor.

7. A method of controlling an electric vehicle comprising:
converting a voltage supplied by a DC power source into a system voltage appearing on a power supply line;
controlling a torque of an AC motor and an input electric power of an MG unit independently from each other, the MG unit including an inverter connected to the power supply line and driving the AC motor;
executing system voltage stabilization control to control the input electric power of the MG unit so as to suppress variation in the system voltage by sending a command value for input electric power control; and
adjusting at least one of a current control gain for torque control and a current control gain for input electric power control in accordance with a control state of the MG unit.

8. The method according to claim 7, wherein:
the current control gain for torque control is adjusted in accordance with the input electric power control amount of the MG unit.

9. The method according to claim 8, wherein:
the current control gain for torque control is adjusted in accordance with a target value or a detection value of at least one of the input electric power control amount, a q-axis current for input electric power control, a d-axis current for input electric power control, a combined q-axis current of the q-axis current for torque control and the q-axis current for input electric power control, and a combined d-axis current of the d-axis current for torque control and the d-axis current for input electric power control.

10. The method according to claim 7, wherein:
the current control gain of the q-axis current for torque control is adjusted primarily when controlling the current for input electric power control toward a weaker magnetic field,and the current control gain of the d-axis current for torque control is adjusted primarily when controlling the current for input electric power control toward a stronger magnetic field.

11. The method according to claim 7, wherein:
the current control gain for input electric power is adjusted in accordance with at least one of a rotation speed, torque and input electric power control amount of the AC motor.

12. The method according to claim 11, wherein:
the current control gain for input electric power is adjusted in accordance with a target value or a detection value of at least one of a rotation speed, torque and input electric power control amount of the AC motor.

* * * * *